Oct. 8, 1946.                M. M. SHAPIRO                2,408,816
         PIEZOELECTRIC GAUGE AND METHOD OF MAKING THE SAME
                         Filed Feb. 10, 1944
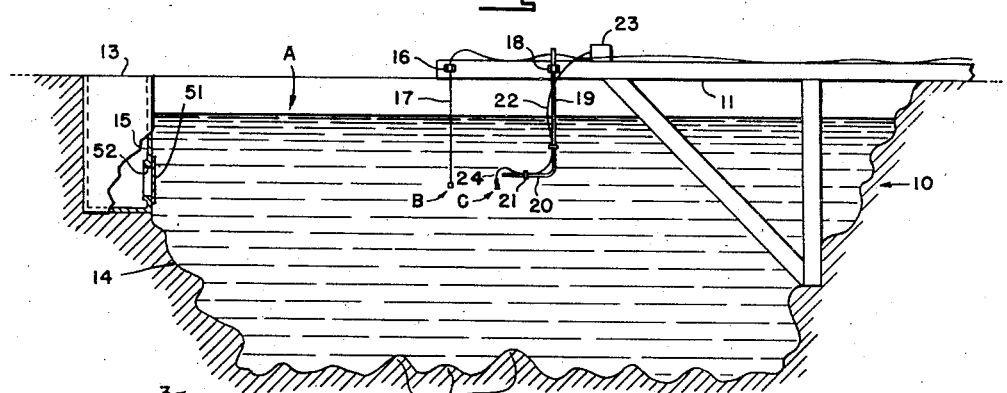
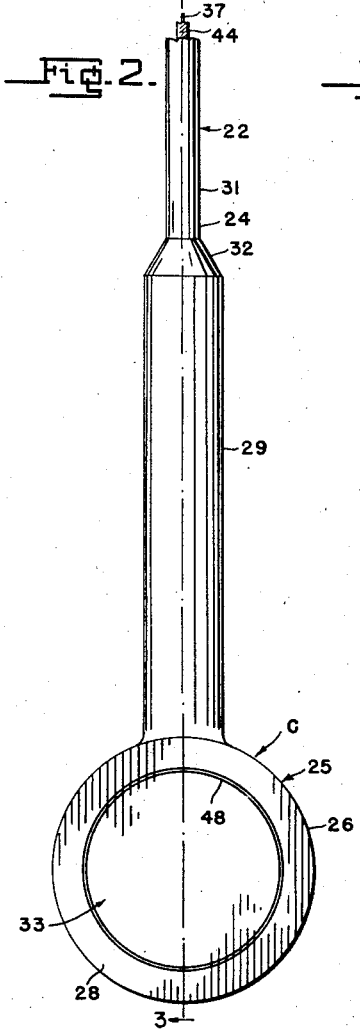
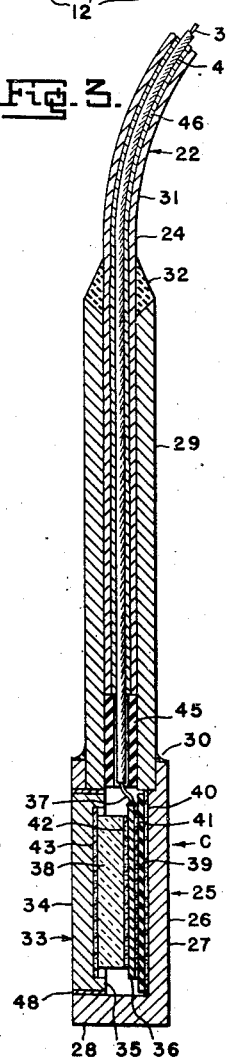
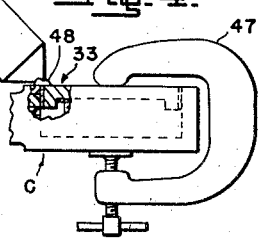
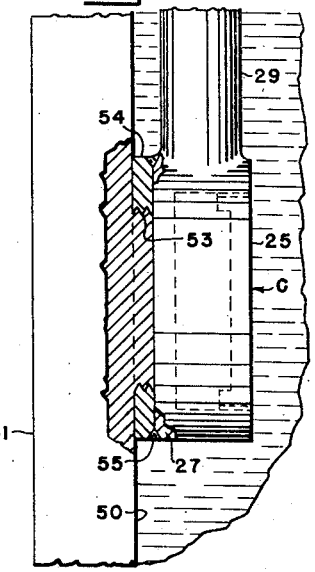
INVENTOR.
Maurice M. Shapiro
BY
ATTORNEY.

Patented Oct. 8, 1946

2,408,816

UNITED STATES PATENT OFFICE 2,408,816

PIEZOELECTRIC GAUGE AND METHOD OF MAKING THE SAME

Maurice M. Shapiro, Cabin John, Md.

Application Feb. 10, 1944, Serial No. 521,885

7 Claims. (Cl. 171—327)

(Granted under the act of March 3, 1883, as amended April 30, 1928; 370 O. G. 757)

The invention relates to improvements in piezoelectric gauges and to methods of making the same, and the primary object of the invention is to provide a piezoelectric gauge suitable for use in the observation and measurement of underwater pressure waves of large amplitude and extremely short duration, such as produced by the underwater detonation of large or small charges of high explosives.

Another object of the invention is the provision of a piezoelectric gauge having the small mass and high natural frequency which is necessary for the observation and accurate measurement of the variation of pressure with time, and the momentum associated with pressure pulses of the character described.

A further object of the invention is to provide a piezoelectric gauge which is rugged and permanently waterproof when exposed to the shock of underwater explosions.

The invention also aims to provide a piezoelectric gauge adapted for use in observing the effect of an underwater pressure wave on a submerged plate or diaphragm having a surface exposed to the pressure wave.

The invention also is directed toward the provision of an integrally bonded and completely sealed piezoelectric gauge and methods of making the same.

Other objects and advantages of the invention will become apparent during the course of the following detailed description, taken in connection with the accompanying drawing, forming a part of this specification, and in which drawing, Figure 1 is a central vertical sectional view of an underwater explosion test pond and diagrammatically illustrating the use of the piezoelectric gauge in the observation and measurement of underwater explosion pressures.

Figure 2 is a greatly enlarged front elevational view of the gauge.

Figure 3 is a central vertical sectional view of the gauge and taken along the line 3—3 of Figure 2.

Figure 4 is a view partly in elevation and partly in section illustrating a step in the method of making the gauge.

Figure 5 is a view partly in side elevation and partly in central vertical section and showing the gauge applied to a plate having an underwater surface.

In the drawing, which for the purpose of illustration shows only a preferred embodiment of the invention, and wherein similar reference characters denote corresponding parts throughout the several views, the letter A generally designates a body of water, B an explosive charge and C the improved piezoelectric gauge.

While tests may be conducted in any suitable body of water, such as the open sea, in the example illustrated, the water A is contained in an explosion test pond 10 provided with an overhanging platform 11 for supporting the equipment and personnel. The walls of the test pond may be provided with irregularly curved, unevenly spaced protuberances 12 to reduce wave reflection, and a heavy water-tight tank 13 may be embedded in one side 14 of the pond with a wall 15 exposed to the water. This test pond forms no part of the present invention and is shown merely for the purpose of illustration.

The explosive charge B may be supported in the water at any desired depth, as by a bracket 16 and a waterproof ignition cable 17.

Supported by the platform in spaced relation to the bracket 16 is a bracket 18 carrying the vertical leg of a depending L-shaped bar 19. Attached to the horizontal leg 20 of the bar, as by a bracket 21, is a coaxial cable 22, preferably of the flexible type disclosed and claimed in the copending application for patent of M. M. Shapiro and B. Stiller Serial No. 522,288 filed February 14, 1944.

In the example shown, the upper end of the cable 22 is connected to suitable instruments diagrammatically indicated at 23 and the submerged end 24 is bent so as to extend forwardly and then downwardly from the horizontal leg 20.

Referring now more particularly to Figures 2 and 3, the piezoelectric gauge C includes a thin flat hollow cylindrical housing or shell 25 formed of brass, this metal having been selected mainly because its modulus of elasticity is close to that of quartz. The housing or shell 25 includes a shallow pan-like container 26 comprising a flat wall 27 and a peripheral flange 28 provided with a projecting brass tube 29 which is silver soldered at 30 to the flange to form a water-tight joint. This tube 29 telescopes over the normally submerged end 24 of the coaxial cable 22 and is soldered to the copper sheath 31 of the cable at 32 to form a water-tight joint.

Telescopically fitting within the flange 28 is a disc-like cover 33 comprising a flat wall 34 and an inner marginal rim 35. The flat wall 34 forms a grounded electrode when the gauge is submerged.

Disposed within the container 26 is a copper sheet 36 constituting an inner electrode and to which the central conductor 37 of the coaxial cable is connected. Positioned between the sheet 36 and the cover wall 34 is a thin circular quartz crystal 38 of a diameter slightly less than the internal diameter of the rim 35. Positioned between the sheet 36 and the container wall 27 is a thin dielectric disc or sheet 39, such as mica. The respective confronting surfaces of the walls 27, 34, sheets 36, 39 and crystal 38 are bonded by layers 40—43 of fusible cementitious material, such as shellac. It will be seen that the piezoelectric transducer assembly thus provided forms with the opposite end walls 27, 34 of the shell a solid body composed entirely of parallel layers which is inherently capable of withstanding extremely high pressures axially of the gauge. When the crystal is subjected to a change in pressure, the opposite charges developed on its two faces are transmitted by induction to the inner electrode and the grounded cover, respectively, through the layers of shellac.

The central conductor 37 of the coaxial cable may be a No. 20 or No. 24 copper wire insulated with enamel and a double layer of glass fiber 44, and known as "DVE" or Double Vitrotex Enameled wire. Fitted in the inner end of the tube 29 is a Bakelite bushing 45 through which the insulated central conductor 37 extends. The small space between the insulated conductor 37 and the flexible copper sheath 31 is preferably filled with ceresin wax 46 to prevent vibration of the conductor within the sheath.

The diameter of the cylindrical shell 25 should be considerably less than the length of the pressure wave. Thus for underwater explosion tests wherein the pressure drops to one third of its peak value in less than seventy microseconds, the shell preferably is less than one-half inch in diameter and its thickness should be less than one-fourth inch, so as not to exceed one-fourth of the length of the pressure wave.

Before assembly, the various parts of the gauge are prepared as follows: The copper sheath 31 of the cable at its end 24, as well as the inner surface of the brass tube 29, are tinned. The edge of the cover along the rim 35 is also tinned to prepare it for soldering to the container flange 28. Pure orange shellac crystals are heated to the melting point; then thin coats of shellac are applied to the inside flat surfaces of the cover 33 and container 26, as well as to both sides of the crystal 38 and mica sheet 39. Before the shellac dries, the mica sheet 39 is cemented to the container wall 27 and the crystal 38 is centrally attached to the inside of the cover wall 34. The rim 35 tends to insure alignment of the crystal with the center of the cover.

In connecting the conductor 37 to the inner sheet copper electrode 36, the coaxial cable 22 is pushed into the brass tube 29 beyond its normal position in the finished gauge, so that the insulated wire protrudes from the container. The Bakelite bushing 45 is then slipped over the glass fiber insulation 44, and the bared end of the conductor is attached to the electrode 36. This may be accomplished by providing a marginal slit in the electrode and compressing the end of the wire in the slit with a peen hammer. Subsequently, the bushing 45 is inserted in the tube 29 and the cable is pulled back until the electrode 36 lies concentrically over the mica sheet 39. Next, the cover with the crystal attached is pressed into the container and, while pressure is maintained by means of a small C-clamp 47, such as shown in Figure 4, the telescopically fitting surfaces of the cover and container are soft-soldered together at 48. During the soldering, the shellac films 40—43 melt so that upon cooling, the various parts are firmly bound together to form a solid mass. The C-clamp 47 is removed only after the metal has cooled.

Figure 5 illustrates means for adapting the housing or shell 25 of the gauge C to the measurement of explosion pressures at the surface 50 of an underwater diaphragm or plate 51. The marginal edge of this diaphragm or plate 51 may be bolted in water-tight fashion over a suitable opening 52 in the exposed wall 15 of the tank 13 illustrated in Figure 1. Soldered or otherwise integrally affixed to the surface 50 of the diaphragm or plate 51 under investigation is a short brass stud 53 adapted for screw threaded engagement with a thin brass nut 54 externally affixed to the container wall 27, as by silver solder 55. The diameter of the nut 54 is the same as that of the container, and its thickness is not less than the length of the stud 53 so that the nut may be threaded into firm engagement with the surface 50.

Various changes may be made in the form of invention and method of manufacture herein shown and described without departing from the spirit of the invention or the scope of the following claims.

The invention described herein may be manufactured and used by or for the Government of the United States of America for governmental purposes without the payment of any royalties thereon or therefor.

I claim:

1. A piezoelectric gauge for use in the observation and measurement of a pressure wave of high amplitude and short duration, such as produced by the underwater detonation of a charge of high explosive, comprising a thin flat hollow cylindrical waterproof shell formed of elastic and electically conductive metal, said shell including spaced end walls and a cylindrical side wall provided with an integral tubular outlet, a piezoelectric transducer assembly comprising a plurality of thin flat discs forming with the end walls of said cylindrical shell a solid body composed entirely of parallel layers and thereby inherently capable of withstanding extremely high pressure axially of the gauge, one of said end walls constituting a grounded electrode for said transducer assembly to permit reduction in the mass and size of the gauge, the mass of the shell being small and the greatest dimension of the shell being less than one-half inch.

2. A piezoelectric gauge for use in observing the effect of a pressure wave of high amplitude and short duration, such as produced by the underwater detonation of a charge of high explosive, on a plate or the like having an underwater surface, said gauge comprising a thin flat hollow waterproof shell formed of elastic electrically conductive metal and provided with a tubular outlet, a piezoelectric transducer assembly comprising a plurality of thin flat discs forming with the flat sides of said shell a solid body composed entirely of parallel layers and thereby inherently capable of withstanding extremely high pressure axially of the gauge, the mass of the gauge being negligible in comparison with the mass of said plate or the like, and screw-threaded coupling means forming a thin solid impulse-transmitting layer between one of the flat sides of said gauge and said underwater surface for releasably fixing the gauge to said plate or the like.

3. In a piezoelectric gauge for use in the observation or measurement of a pressure wave of high amplitude and short duration, such as produced by the underwater detonation of a charge of high explosive, a thin flat hollow housing formed of elastic electrically conductive metal, said housing including a shallow pan-like container and a disc-like cover, said container comprising a flat wall, a peripheral flange and a tubular outlet integral with said flange, said cover comprising a flat wall and an inside marginal rim telescopically fitting within said flange, a dielectric sheet adjacent one of said flat walls, a piezoelectric crystal adjacent the other of said flat walls, a sheet metal electrode between said crystal and said dielectric sheet, a conductor extending through said outlet and connected to said electrode, and means sealing the telescopically fitting surfaces of said container and cover with said dielectric sheet, electrode and crystal in tightly clamped relation between said flat walls.

4. In a piezoelectric gauge for use in the observation or measurement of a pressure wave of high amplitude and short duration, such as produced by the underwater detonation of a charge of high explosive, a thin flat hollow housing formed of elastic electrically conductive metal, said housing including a shallow pan-like container and a disc-like cover, said container comprising a flat wall, a peripheral flange and a tubular outlet integral with said flange, said cover comprising a flat wall and an inside marginal rim telescopically fitting within said flange, the flat wall of said cover constituting a grounded electrode, an inner sheet metal electrode disposed within the container, a dielectric sheet between said inner electrode and the flat wall of said container, a thin flat piezoelectric crystal disposed within the container between said electrodes, the periphery of said crystal being spaced inwardly of said rim, thin adhesive layers between the respective confronting surfaces of said flat walls, dielectric sheet, inner electrode and crystal, a conductor extending through said tubular outlet and connected to said inner electrode, and means sealing the telescopically fitting surfaces of said container and cover with said crystal, inner electrode, dielectric sheet and adhesive layers in tightly clamped relation between said flat walls to form an integral substantially solid laminated body.

5. In a piezoelectric gauge for use in the observation or measurement of a pressure wave of high amplitude and short duration, such as produced by the underweater detonation of a charge of high explosive, a thin flat hollow housing formed of elastic electrically conductive metal, said housing including a shallow pan-like container and a disc-like cover, said container comprising a flat wall, a peripheral flange and a tubular outlet integral with said flange, said cover comprising a flat wall and an inside marginal rim telescopically fitting within said flange, the flat wall of said cover constituting a grounded electrode, an inner sheet metal electrode disposed within the container, a dielectric sheet between said inner electrode and the flat wall of said container, a thin flat piezoelectric crystal disposed within the container between said electrodes, the peripheries of said crystal and said inner electrode being spaced inwardly of said rim and flange respectively, thin layers of a fusible adhesive between the respective confronting surfaces of said flat walls, dielectric sheet, inner electrode and crystal, a conductor extending through said tubular outlet and connected to said inner electrode, and a solder joint sealing the telescopically fitting surfaces of said container and cover against the ingress of water or moisture, with said crystal, inner electrode, dielectric sheet and adhesive layers in tightly clamped and adhesively bonded relation between said flat walls.

6. In a piezoelectric gauge for use in the observation or measurement of a pressure wave of high amplitude and short duration, such as produced by the underwater detonation of a charge of high explosive, a thin flat hollow water-tight shell formed of elastic electrically conductive metal, said shell including parallel sidewalls and a peripheral wall and being provided with a tubular outlet integral with said peripheral wall, one of said parallel sidewalls constituting a grounded electrode, an inner sheet metal electrode disposed within the shell, a dielectric sheet between said inner electrode and the other of said parallel sidewalls, a thin flat piezoelectric crystal disposed within the shell between said electrodes, the peripheries of said crystal and said inner electrode being spaced inwardly of the peripheral wall of the shell, thin adhesive layers bonding the respective confronting surfaces of said parallel sidewalls, dielectric sheet, inner electrode and crystal so as to form an integral laminated body substantially devoid of pockets between said respective confronting surfaces, a conductor extending through said tubular outlet and connected to said inner electrode, and means for insulating said conductor therefrom.

7. The method of assembling a piezoelectric gauge including a metal container, a plurality of thin flat elements fitting in the container and a telescopically fitting metal cover, to form an integral waterproof unit, said method comprising applying a fusible cement coating to at least one of each pair of confronting surfaces of said elements, container and cover to hold said elements in a predetermined preliminarily assembled relationship, disposing said cover in telescopically fitted relation to the container with said preliminarily assembled elements in the container, pressing said cover and container together so as to tightly hold said elements in predetermined position therebetween, soldering the telescopically fitting surfaces of said container and cover with said fusibly cemented elements clamped therebetween so as to remain in predetermined relationship upon fusing of said coatings as a result of the soldering operation, and cooling said container to a temperature below the fusing temperature of said cement before removing the pressure on the container and cover.

MAURICE M. SHAPIRO.